United States Patent
Shouyama

(10) Patent No.: US 10,046,529 B2
(45) Date of Patent: Aug. 14, 2018

(54) METHOD FOR REPAIRING RADIAL TIRE, REPAIRED RADIAL TIRE, AND PATCH RUBBER

(75) Inventor: Yoshinobu Shouyama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/879,263

(22) PCT Filed: Oct. 24, 2011

(86) PCT No.: PCT/JP2011/005941
§ 371 (c)(1),
(2), (4) Date: May 10, 2013

(87) PCT Pub. No.: WO2012/053226
PCT Pub. Date: Apr. 26, 2012

(65) Prior Publication Data
US 2013/0220503 A1    Aug. 29, 2013

(30) Foreign Application Priority Data

Oct. 22, 2010  (JP) ................. 2010-237818
Oct. 26, 2010  (JP) ................. 2010-239510

(51) Int. Cl.
*B29C 73/10*    (2006.01)
*B29C 73/06*    (2006.01)
*B29L 30/00*    (2006.01)

(52) U.S. Cl.
CPC ............ *B29C 73/10* (2013.01); *B29C 73/06* (2013.01); *B29L 2030/00* (2013.01); *Y10T 152/10495* (2015.01); *Y10T 152/10882* (2015.01)

(58) Field of Classification Search
CPC .................................................... B29C 73/10
(Continued)

(56) References Cited

U.S. PATENT DOCUMENTS 3,133,585 A * 5/1964 Iknayan ................. 152/367
3,198,234 A * 8/1965 Jean-Marie Massoubre
.................................. 152/367
(Continued)

FOREIGN PATENT DOCUMENTS

AU    2011319290 A    5/2013
EP      0279901 A2    8/1988
(Continued)

OTHER PUBLICATIONS

"Radial Tire Section Repair." Patch Rubber Company. 2003. [retrieved on Oct. 23, 2014]. Retrieved from the Internet: <URL: http://www.patchrubber.com/training/radial_section.pdf>.*
(Continued)

*Primary Examiner* — Robert C Dye
(74) *Attorney, Agent, or Firm* — Sughrue Mion, PLLC

(57) ABSTRACT

Provided is a method for repairing a radial tire that enhances the durability of patch rubber attached to a damaged portion of a carcass ply from the inner side of the tire and that extends the service life of the repaired tire while reducing the repair time.
The method according to the present invention for repairing a radial tire (1) includes a step of attaching a patch rubber (10), in which a plurality of reinforcing elements (11) are arranged in parallel and covered with rubber, from the inner side of the tire to a damaged portion (7) of a carcass ply (5a) when at least one ply cord (6a) in the carcass ply is broken along with ply rubber at a sidewall portion (3). The patch rubber is attached so that the reinforcing elements (11) are parallel to a tire radial direction and so that inner edges (11a, 11b, 11c) of the reinforcing elements (11) in the tire radial direction are positioned to at least partially have different mutually distances in a perpendicular direction from a tire circumferential line.

5 Claims, 13 Drawing Sheets

(58) Field of Classification Search
USPC .................................. 152/367–373; 156/97
See application file for complete search history.

(56) References Cited

U.S. PATENT DOCUMENTS

| | | | | |
|---|---|---|---|---|
| 4,333,508 | A * | 6/1982 | DiRocco et al. | 152/367 |
| 5,139,840 | A * | 8/1992 | Ferrara | 428/78 |
| 7,082,978 | B2 * | 8/2006 | Sinopoli et al. | 152/556 |
| 8,714,219 | B2 * | 5/2014 | Colby et al. | 156/97 |
| 8,720,510 | B2 * | 5/2014 | Zarak | 152/367 |
| 2010/0258237 | A1 * | 10/2010 | Bailey et al. | 156/97 |
| 2013/0220503 | A1 | 8/2013 | Shouyama | |

FOREIGN PATENT DOCUMENTS

| | | |
|---|---|---|
| JP | 2-162029 A | 6/1990 |
| JP | 8-244124 A | 9/1996 |
| JP | 11-010746 A | 1/1999 |
| JP | 2000-512230 A | 9/2000 |
| WO | WO2009/157941 * | 12/2009 |
| WO | WO2009/157944 * | 12/2009 |
| WO | WO2010/002394 * | 1/2010 |

OTHER PUBLICATIONS

First Office Action dated Jul. 14, 2014 in corresponding Chinese Patent Application No. 2014070901037690 with English translation.
International Search Report of PCT/JP2011/005941 dated Nov. 15, 2011.
Communication dated Sep. 16, 2014 from the Japanese Patent Office in counterpart application No. 2012-539614.
Communication dated Dec. 1, 2014 from the Canadian Intellectual Property Office in counterpart application No. 2,815,468.
Chinese Office Action issued in corresponding Chinese Application No. 201180051034.8, dated Jan. 15, 2015.

* cited by examiner

FIG. 7
(a)
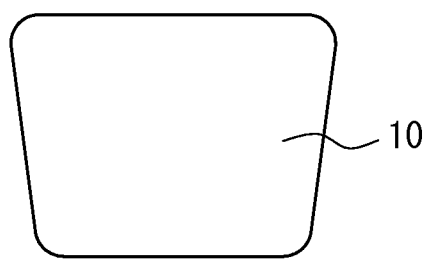
(b)
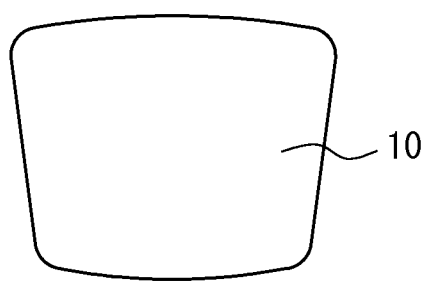
(c)
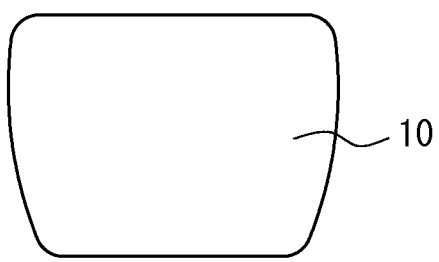

FIG. 11
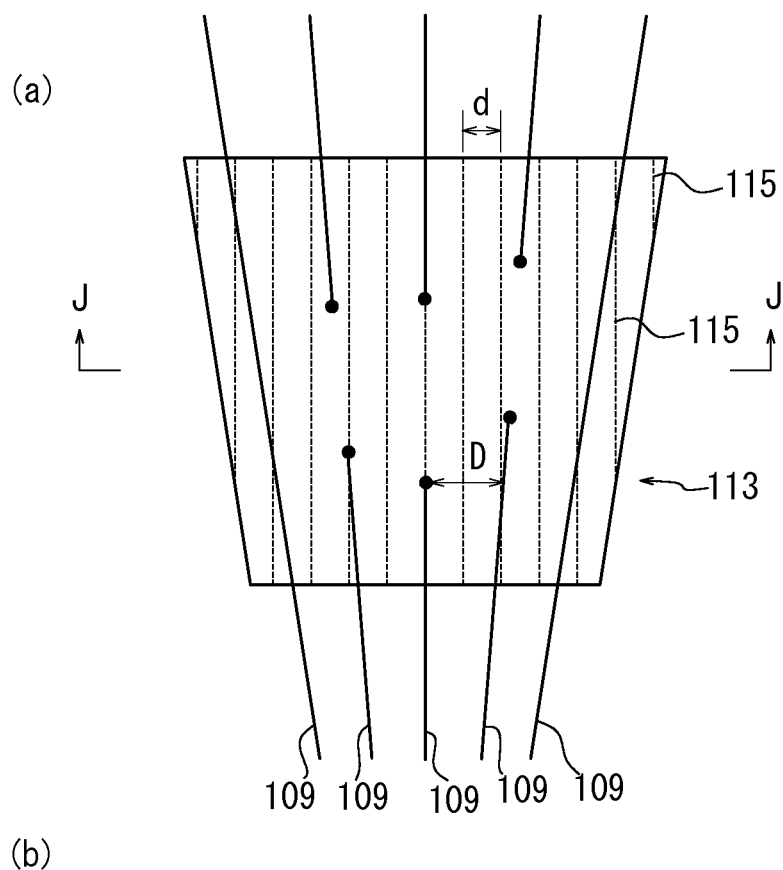
(a)
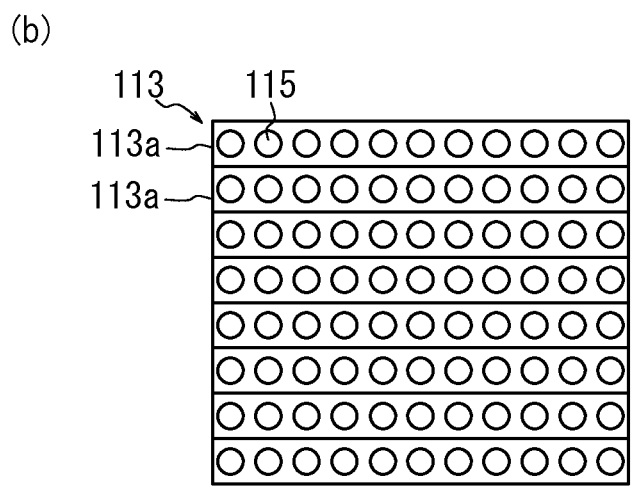
(b)

METHOD FOR REPAIRING RADIAL TIRE, REPAIRED RADIAL TIRE, AND PATCH RUBBER

CROSS REFERENCE TO RELATED APPLICATIONS

This application is a National Stage of International Application No. PCT/JP2011/005941 filed Oct. 24, 2011, claiming priority based on Japanese Patent Application Nos. 2010-237818, filed Oct. 22, 2010 and 2010-239510, filed Oct. 26, 2010, the contents of all of which are incorporated herein by reference in their entirety.

TECHNICAL FIELD

The present invention relates to a method for repairing a radial tire and a repaired radial tire, and in particular to a method for repairing a radial tire that enhances the durability of a patch rubber attached to a damaged portion of a carcass ply from the inner side of the tire and that extends the service life of the repaired tire.

BACKGROUND ART

Radial tires, especially supersized tires such as construction vehicle tires, may suffer a side cut due to a rock, a large protruding object, or the like, and a ply cord in a carcass ply may break along with ply rubber at the sidewall portion. In some cases, the break may also reach the inner liner at the inner side of the tire.

One method for repairing a radial tire damaged in this way is to use a patch rubber constituted by a reinforcement sheet in which a plurality of reinforcing elements (patch cords) arranged in parallel are covered with rubber. The patch rubber is attached with adhesive from the inner side of the tire to the damaged portion of the carcass ply where the ply cord has broken in order to reinforce the damaged portion with the patch cords. A representative conventional technique applying this method will be described with reference to FIG. 8. FIG. 8 is a plan view of the sidewall portion from inside the tire, transparently showing a carcass ply $5a_1$ and a patch rubber 40 attached to the carcass ply. A tire radial direction is indicated by R. Among a plurality of ply cords 6 in the carcass ply $5a_1$, a certain number of ply cords 6a are broken. Note that the ply cords 6a extend radially from the inside towards the outside in the tire radial direction R. The rectangular patch rubber 40 attached to the damaged region is a cord rubber cover layer in which a plurality of patch cords 41 arranged in parallel are covered with rubber and vulcanized. The patch rubber 40 is attached to the damaged region so that the patch cords 41 are parallel to a tire radial direction (in FIG. 8, the direction in which the middle ply cord, among the three broken ply cords, extends) and so that the upper side 42a and lower side 42b of the rectangle extend in the tire circumferential direction.

Patent Literature 1 discloses a technique for reinforcement using a patch rubber that includes a metal cord rubber layer portion with a plurality of metal cords covered in rubber, with the patch rubber being attached by embedding this portion in the damaged region in which the carcass ply is broken, so that the metal cords connect the broken portion of the broken ply cords.

CITATION LIST

Patent Literature

PTL 1: JP2162029A

SUMMARY OF INVENTION

Upon examination, the inventor discovered that the following problems occur with the repair method illustrated in FIG. 8. In FIG. 8, inner edges 41a of the plurality of patch cords 41 in the tire radial direction are in a straight line along the lower side 42b of the rectangle. The severed portion (edge) of the patch cords adheres weakly to the surrounding rubber. Therefore, the edges 41a are continuous in a straight line, making the interval between the severed portion of each patch cord 41 narrow. In this case, if separation from the surrounding rubber occurs at one of the edges 41a, the crack easily spreads to neighboring edges. As a result, separation occurs at a plurality of edges 41a, causing damage again at the portion repaired by the patch rubber 40. As the interval between edges 41a is more narrow, the cracks spread more easily, and as the length of the straight line increases, damage occurs earlier.

In the case of a radial tire, as described above, the ply cords 6 extend radially from the inside towards the outside in the tire radial direction R. Therefore, in the broken ply cords 6a, a distance y1 in the tire circumferential direction of the broken cord edges at the inner side in the tire radial direction is shorter than a distance x1 in the tire circumferential direction of the broken cord edges at the outer side in the tire radial direction. Accordingly, when the length of the upper side 42a of the patch cords is appropriately set from the perspective of the reinforcement effect (for example, triple the distance x1), the lower side 42b of the rectangle is the same length as the upper side yet has an unnecessary length from the perspective of the reinforcement effect. In other words, at the inner edge in the tire radial direction, more edges than are necessary from the perspective of the reinforcement effect are in a straight line.

Furthermore, the repair method illustrated in FIG. 8 requires a certain amount of repair time to buff around the damaged portion and to attach the patch rubber with adhesive. By attaching a patch rubber larger than necessary, as described above, the repair time is inevitably prolonged.

In light of the above problems, it is an object of the present invention to provide a method for repairing a radial tire, and a radial tire repaired with the method, that enhances the durability of the patch rubber attached to the damaged portion of a carcass ply from the inner side of the tire and that extends the service life of the repaired tire while reducing the repair time.

Note that with the technique in Patent Literature 1, the metal cords enclosed in the patch rubber are embedded in the broken ply cord portion and only serve as a replacement for the ply cords. No effect of reinforcing the damaged portion is achieved with the metal cords, and therefore the reinforcement effect is even worse than when using the reinforcement method illustrated in FIG. 8.

Based on the above examination, the inventor conceived of preventing a reduction in durability of the patch rubber, caused by separation of the ends, by not aligning the ends of the patch cords in a straight line. Furthermore, not aligning the inner edges of the patch cords in the tire radial direction in a straight line does not sacrifice the reinforcing effect.

In view of the above object, an outline of the present invention is as follows.

(1) A method for repairing a radial tire comprising a tread portion, a pair of sidewall portions extending inwards in a tire radial direction from either edge of the tread portion, bead portions that extend respectively from the sidewall portions inwards in the tire radial direction, and a carcass having at least one radial carcass ply with a plurality of ply cords covered in ply rubber, the carcass ply extending toroidally across the bead portions, the sidewall portions, and the tread portion, at least one ply cord in the carcass ply being broken along with ply rubber at one of the sidewall portions, the method comprising the step of attaching a patch rubber from an inner side of the tire to a damaged portion of the carcass ply with the broken ply cord, the patch rubber including a reinforcement sheet with a plurality of reinforcing elements arranged in parallel and covered with rubber, wherein the patch rubber is attached so that the reinforcing elements are parallel to the tire radial direction and so that inner edges of the reinforcing elements in the tire radial direction are positioned to at least partially have mutually different distances in a perpendicular direction from a tire circumferential line.

(2) The method for repairing a radial tire according to (1), wherein an interval between the reinforcing elements is narrower than an interval between the ply cords.

(3) The method for repairing a radial tire according to (1) or (2), wherein: the patch rubber has a generally trapezoidal shape; and the patch rubber is attached so that between a pair of parallel sides of the patch rubber, a long side is located outwards in the tire radial direction, and a short side is located inwards in the tire radial direction, and so that the long side and the short side extend in a tire circumferential direction.

(4) The method for repairing a radial tire according to any one of (1) through (3), wherein: in a plan view of the sidewall portion from inside the tire transparently showing the carcass ply closest to the inside of the tire, a region connecting four broken cord edges of two ply cords, among broken ply cords, most separated in a tire circumferential direction is defined as a damaged region, and an outermost side and an innermost side in the tire radial direction are respectively an upper side of length x and a lower side of length y; edges of the patch rubber positioned along an extension of the upper side are at a distance of $(2 \text{ to } 4) \times (x/2)$ from a center P of the upper side; edges of the patch rubber positioned along an extension of the lower side are at a distance of $(2 \text{ to } 4) \times (y/2)$ from a center Q of the lower side; and edges of the patch rubber positioned along a line PQ are at a distance of $(2 \text{ to } 4) \times (z/2)$ from a center M of a line segment PQ of length z.

(5) The method for repairing a radial tire according to (4), wherein an angle of intersection between the reinforcing elements in every reinforcement sheet and the line PQ connecting the center P of the upper side with the center Q of the lower side is at least 0° and at most 30°.

(6) The method for repairing a radial tire according to any one of (1) through (5), wherein: the patch rubber is unvulcanized rubber; and after attaching the patch rubber, partial vulcanizing is performed on the damaged portion.

(7) The method for repairing a radial tire according to any one of (1) through (6), further comprising the steps of: removing side rubber around the damaged portion along the sidewall portion from outside the tire until the carcass ply is exposed; and removing inner liner rubber around the damaged portion along the sidewall portion from inside the tire until the carcass ply is exposed; and subsequently: attaching the patch rubber to the damaged portion of the carcass ply; and applying new side rubber around the damaged portion from outside the tire.

(8) The method for repairing a radial tire according to any one of (1) through (6), further comprising the steps of: preparing two pieces of the patch rubbers per one damaged portion; removing side rubber around the damaged portion along the sidewall portion from outside the tire; removing inner liner rubber around the damaged portion along the sidewall portion from inside the tire to expose edges formed by the break in the carcass ply; and respectively attaching the patch rubbers from the inner side and an outer side of the radial tire at locations where the side rubber and inner liner rubber are extracted from the damaged portion so that the patch rubbers sandwich and hold the edges formed by the break in the carcass ply.

(9) The method for repairing a radial tire according to (8), wherein the patch rubber attached from the outer side of the radial tire is larger than the patch rubber attached from the inner side of the radial tire.

(10) The method for repairing a radial tire according to (8) or (9), wherein when attaching the patch rubbers respectively from the inner side and the outer side of the radial tire, an extension direction of the reinforcing elements in each of the patch rubbers is aligned with an extension direction of the broken ply cord.

(11) The method for repairing a radial tire according to any one of (8) through (10), wherein an angle of intersection between the ply cords and each of the reinforcing elements in the patch rubbers is at least 0° and at most 30°.

(12) A radial tire repaired with the method for repairing according to any one of (8) through (11).

(13) A repaired radial tire comprising a tread portion, a pair of sidewall portions extending inwards in a tire radial direction from either edge of the tread portion, bead portions that extend respectively from the sidewall portions inwards in the tire radial direction, and a carcass having at least one radial carcass ply with a plurality of ply cords covered in ply rubber, the carcass ply extending toroidally across the bead portions, the sidewall portions, and the tread portion, wherein: at least one ply cord in the carcass ply is broken along with ply rubber at one of the sidewall portions; a patch rubber is attached from an inner side of the tire to a damaged portion of the carcass ply with the broken ply cord, the patch rubber including a reinforcement sheet with a plurality of reinforcing elements arranged in parallel and covered with rubber; and the patch rubber is attached so that the reinforcing elements are parallel to a tire radial direction and so that inner edges of the reinforcing elements in the tire radial direction are positioned to at least partially have mutually different distances in a perpendicular direction from a tire circumferential line.

(14) The repaired radial tire according to (13), wherein an interval between the reinforcing elements is narrower than an interval between the ply cords.

(15) The repaired radial tire according to (13) or (14), wherein: the patch rubber has a generally trapezoidal shape; and the patch rubber is attached so that between a pair of parallel sides of the patch rubber, a long side is located outwards in the tire radial direction, and a short side is located inwards in the tire radial direction, and so that the long side and the short side extend in a tire circumferential direction.

(16) The radial tire according to any one of (13) through (15), wherein: in a plan view of the sidewall portion from inside the tire transparently showing the carcass ply closest to the inside of the tire, a region connecting four broken cord edges of two ply cords, among broken ply cords, most separated in the tire circumferential direction is defined as a damaged region, and an outermost side and an innermost side in the tire radial direction are respectively an upper side of length x and a lower side of length y; edges of the patch rubber positioned along an extension of the upper side are at a distance of (2 to 4)×(x/2) from a center P of the upper side; edges of the patch rubber positioned along an extension of the lower side are at a distance of (2 to 4)×(y/2) from a center Q of the lower side; and edges of the patch rubber positioned along a line PQ are at a distance of (2 to 4)×(z/2) from a center M of a line segment PQ of length z.

(17) The radial tire according to (16), wherein an angle of intersection between the reinforcing elements in every reinforcement sheet and the line PQ connecting the center P of the upper side with the center Q of the lower side is at least 0° and at most 30°.

(18) A patch rubber for repairing a radial tire, comprising: at least one reinforcement sheet with a plurality of reinforcing elements extending in parallel and covered with rubber, wherein among edges of the reinforcing elements, edges on at least one side of the reinforcing elements are positioned to at least partially have mutually different distances in a perpendicular direction from a given line.

(19) The patch rubber according to (18), wherein the edges of the reinforcing elements are distributed along all sides of the patch rubber.

According to the present invention, the patch rubber is attached so that inner edges of the reinforcing elements in the tire radial direction are positioned to at least partially have mutually different distances in a perpendicular direction from a tire circumferential line. Therefore, the inner edges of the patch cords in the tire radial direction are not aligned in a straight line. As a result, it is possible to enhance the durability of the patch rubber attached to the damaged portion of the carcass ply from the inner side of the tire and to extend the service life of the repaired tire. Moreover, since the inner edges in the tire radial direction are as described above, the repair time can be shortened compared to a rectangular patch rubber as in FIG. 8, since the patch rubber is not attached to an unnecessary portion from the perspective of the reinforcement effect.

BRIEF DESCRIPTION OF DRAWINGS

The present invention will be further described below with reference to the accompanying drawings, wherein:

FIG. 7 illustrates roughly trapezoidal shapes of the patch rubber that may be used in the present invention, with (a) being a trapezoid with curved vertices, (b) being a trapezoid in which the vertices and the pair of parallel sides are curved, and (c) being a trapezoid in which the vertices and the two sides other than the pair of parallel sides are curved;

FIG. 11(a) is a plan view illustrating an example of a patch rubber that may be used in the repair method of the present invention, and (b) is a cross-sectional diagram along the J-J line in FIG. 11(a);

DESCRIPTION OF EMBODIMENTS

The present invention will now be described in greater detail with reference to the drawings. Note that as a general rule, the same constituent elements are labeled with the same reference signs, and a description thereof is omitted.

Figure 1:
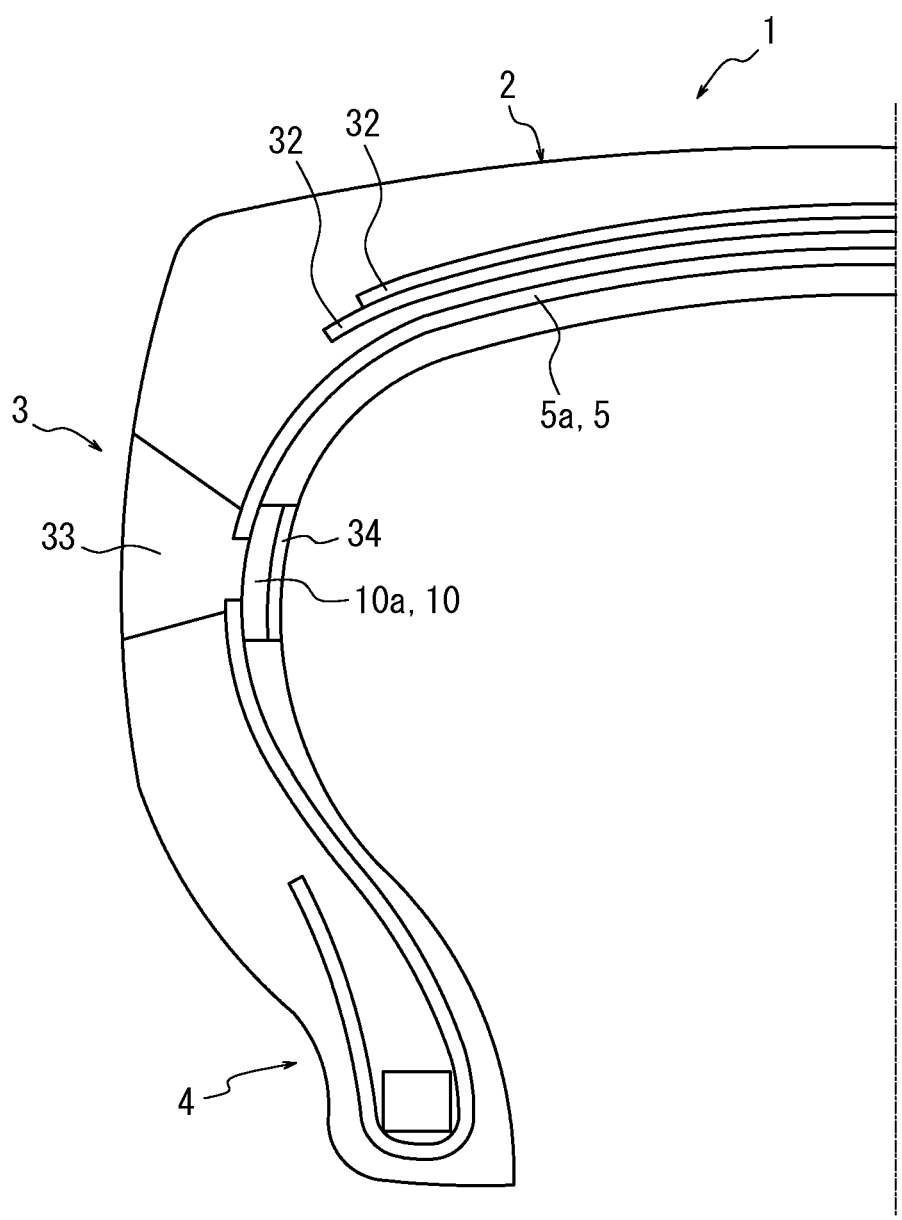
FIG. 1 is a half cross-sectional diagram in the tire width direction of a representative repaired radial tire according to the present invention.

FIG. 1 illustrates a representative repaired radial tire according to the present invention. The radial tire 1 subject to the repair method of the present invention has a tread portion 2 (only illustrated in half of the tire), a pair of sidewall portions 3 (only one illustrated) extending inwards in the tire radial direction from either edge of the tread portion 2, bead portions 4 (only one illustrated) that extend respectively from the sidewall portions 3 inwards in the tire radial direction, and a carcass 5 with at least one radial carcass ply 5a (one in FIG. 1) extending toroidally across the bead portions 4, the sidewall portions 3, and the tread portion 2. The carcass ply 5a is a cord rubber cover layer in which a plurality of ply cords 6 are covered in ply rubber. Steel, organic fiber, and the like are examples of the cord material. The ply cords 6 are arranged at an angle between 70° and 90° with respect to the tire circumferential direction. Natural rubber, synthetic rubber, carbon black, and the like are examples of the material for the ply rubber, and the hardness (hereinafter the JIS-A hardness (JIS-K-6253)) is approximately from 40 to 80.

In one of the sidewall portions 3, when at least one ply cord 6a (in FIG. 4, three) in the carcass ply 5a breaks along with ply rubber, the repair method of the present invention is applied. An embodiment of the repair method according to the present invention will be described along with the effects thereof.

Embodiment 1: Method for Repairing a Radial Tire

First, the repair method according to the present embodiment will be described. FIG. 3(a) illustrates a state in which a radial tire 1 has received a side cut at one of the sidewall portions 3 and a carcass ply 5a is broken. In FIG. 3(a), the cut has reached the inner liner at the inside of the tire. Reference sign 7 denotes the damaged portion of the carcass ply.

First, a step is performed to extract the side rubber portions 30 around the damaged portion 7 from outside the tire until the carcass ply 5a is exposed. In the case of multiple plies, extraction is performed until the outermost ply in the tire width direction is exposed. Extraction of the side rubber portions 30 may be performed, for example, using a regroover, and finishing may be performed by buffing or the like immediately before exposure of the carcass ply 5a. FIG. 3(b) illustrates the state after extraction. Natural rubber, synthetic rubber, carbon black, and the like are examples of the material for the side rubber. The hardness is approximately from 30 to 70, and the side rubber is softer than the ply rubber.

Next, a step is performed to extract the inner liner rubber portions 31 around the damaged portion 7 from inside the tire until the carcass ply 5a is exposed. In the case of multiple plies, extraction is performed until the innermost ply in the tire width direction is exposed. Extraction of the inner liner rubber portions 31 may be performed similarly to extraction of the side rubber portions 30. For subsequent attachment of the patch rubber 10 to the exposed surface after extraction of the inner liner rubber portions 31, finishing is preferably performed by buffing in order to form an appropriate unevenness on the surface. FIG. 3(c) illustrates the state after extraction. Highly airtight butyl rubber is an example of the material for the inner liner, and the inner liner is even softer than the side rubber.

Next, a step to apply a new side rubber portion 33 around the damaged portion 7 from outside the tire is performed. The new side rubber portion 33 is unvulcanized soft rubber and may be spread, for example with a spatula, so as to fill the damaged portion 7 and the sidewall portion. FIG. 3(d) illustrates the state after application. The new side rubber portion 33 is preferably the same material as before repair.

Next, a step is performed to attach the patch rubber 10 to the damaged portion 7 of the carcass ply from the inner side of the tire. In the present embodiment, the patch rubber 10 is integrated in advance with a new inner liner rubber portion 34 and attached to the damaged portion 7 using adhesive or the like. The new inner liner rubber portion 34 is preferably the same butyl rubber as before repair. FIG. 3(e) illustrates the state after attachment of the patch rubber 10. The new side rubber portion 33 may be applied from outside the tire after attachment of the patch rubber 10. By removing the rubber around the damaged portion 7 before attaching the patch rubber 10, as in the present embodiment, the patch rubber 10 can reliably and easily be attached to the carcass ply 5a.

Figure 4:
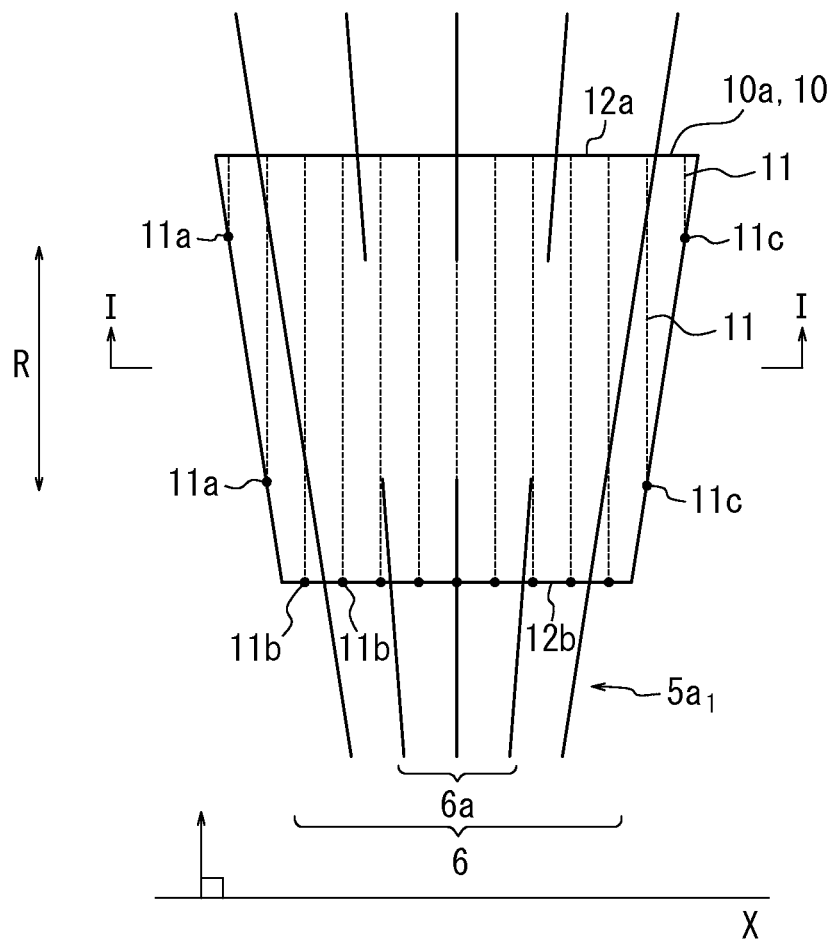
FIG. 4 transparently illustrates a carcass ply $5a_1$, closest to the inside of the tire in the sidewall portion at the inside of the tire, and the patch rubber 10 attached to the carcass ply, with ply cords 6 being shown with a solid line and patch cords 11 with a dashed line to illustrate the relationship between the ply cords 6 and the patch cords 11, even though they are covered in rubber.
Figure 5:
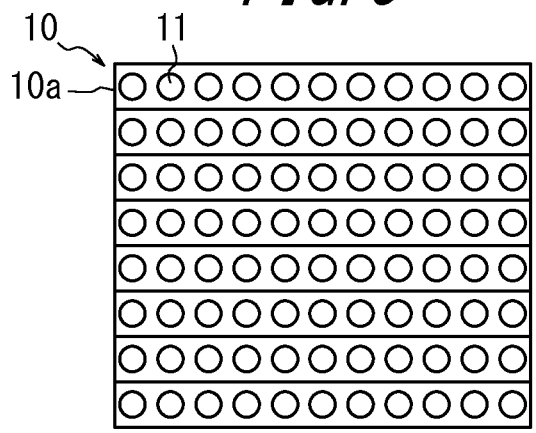
FIG. 5 is a diagram illustrating only the patch rubber 10 within an I-I cross-sectional diagram in FIG. 4.

As illustrated in FIGS. 4 and 5, the patch rubber 10 is constituted by a reinforcement sheet 10a that is a cord rubber cover layer in which a plurality of reinforcing elements 11 arranged in parallel are covered with rubber. Note that in the present invention, the "plurality of reinforcing elements arranged in parallel" does not limit the reinforcing elements to being parallel in a strict mathematical sense, but rather means that the reinforcing elements extend in the same direction. Natural rubber, synthetic rubber, carbon black, and the like are examples of the material for the rubber covering the reinforcing elements. The hardness is approximately from 40 to 80, and in particular the rubber is preferably the same as the rubber used in the carcass ply. The reinforcing elements 11 are not limited, as long as they are elements that reinforce the damaged portion, and may be not only twisted cords but also a single filament or a plurality of non-twisted filaments. A preferable example of the reinforcing elements 11 is an extremely thin nylon cord with a cord diameter of between 0.4 and 1.5 mm. The tensile modulus of elasticity is preferably the average modulus of elasticity at an elongation of x/3 to 2x/3(%) with respect to the elongation-to-break x (%). The tensile modulus of elasticity is, for example, 5 GPa and is preferably between 3.0 and 7.0 GPa. The reinforcing elements 11 are preferably thinner than the ply cords. This is because if the same material and diameter as the ply cords are used, the reinforcing elements bear too much tension, causing the edges to separate easily.

Figure 2:
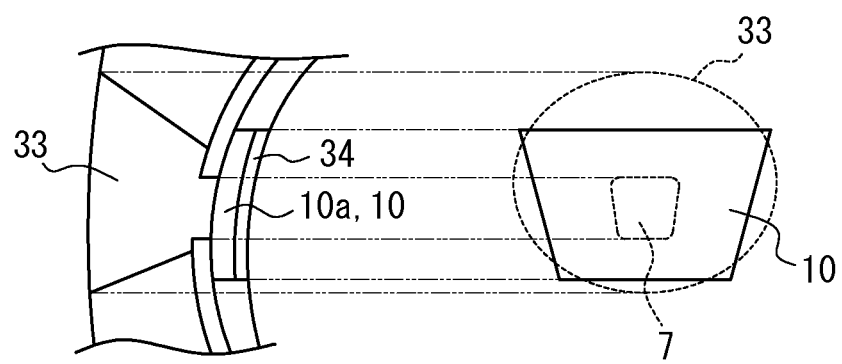
FIG. 2 contains, to the left, a diagram of an enlargement of the damaged portion in the carcass 5 of the sidewall portion 3 in FIG. 1, and to the right, a view of the damaged portion from the inner side of the tire, illustrating with a dashed line a damaged portion 7 of a carcass ply having a patch rubber 10 attached thereto and a boundary line at the tire outer surface of a side rubber portion 33 that is newly applied during repair.

The patch rubber 10 is not embedded in the damaged portion 7, but rather is attached as a reinforcement sheet from inside the tire so as to cover the entire damaged portion 7 (right side of FIG. 2). Therefore, the patch rubber 10 appears to be a flat sheet.

Before attachment, the patch rubber 10 is preferably unvulcanized rubber, and after the step of attaching the patch rubber 10, partial vulcanizing is preferably performed on the damaged portion 7. By using unvulcanized rubber, the patch rubber 10 can be attached precisely to the surface of the damaged portion and then vulcanized to prevent air bubbles from remaining around the damaged portion. Furthermore, even if a pre-vulcanized patch rubber is attached, partial vulcanizing needs to be performed on the damaged portion to vulcanize the newly applied side rubber portion 33 and the like. Therefore, pre-vulcanizing the patch rubber is not preferable, since the patch rubber 10 will be end up being vulcanized more than necessary.

The left side of FIG. 2 illustrates an enlargement of the repaired portion in a radial tire repaired in this way. In the present embodiment, the patch rubber 10 has a trapezoidal shape, as illustrated in the right side of FIG. 2 and in FIG. 4. The patch rubber 10 is attached so that, between a pair of parallel sides 12a and 12b of the patch rubber 10, the long side 12a is located outwards in the tire radial direction, the short side 12b is located inwards in the tire radial direction, and the long side 12a and the short side 12b extend in a tire circumferential direction. In FIG. 4, the tire radial direction is indicated by R. In the patch rubber 10 with a trapezoidal shape, the reinforcing elements 11 are arranged to extend in a direction perpendicular to the long side 12a and the short side 12b. Therefore, the patch rubber 10 is attached so that the reinforcing elements 11 are parallel to a tire radial direction R (in the present embodiment, the direction in which the middle ply cord, among the three broken ply cords 6a, extends).

Figure 8:
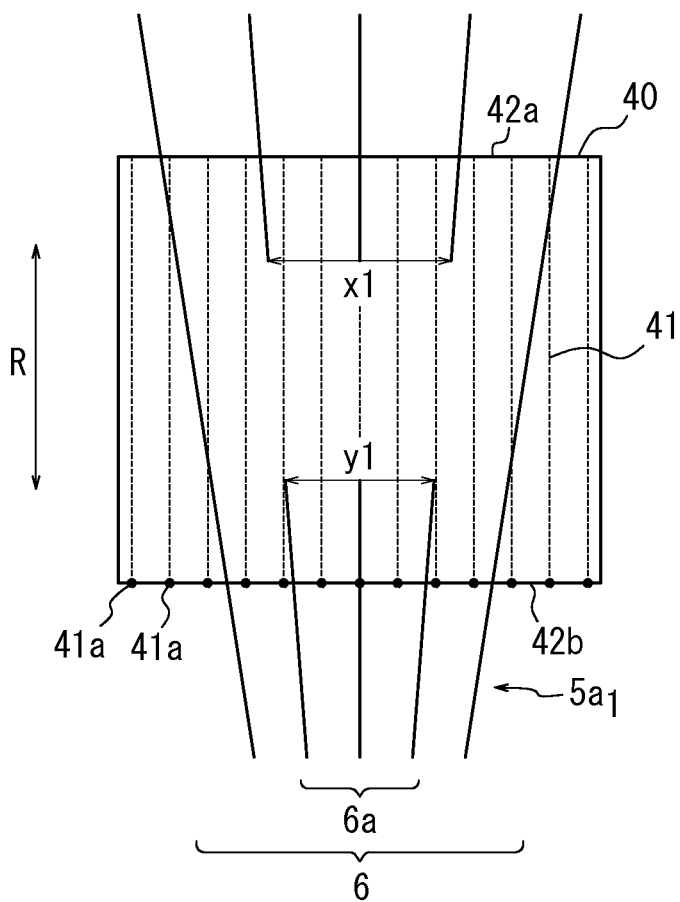
FIG. 8 is, like FIG. 4, a plan view of the sidewall portion from inside the tire, transparently showing a carcass ply $5a_1$ and a patch rubber 10 attached to the carcass ply, for a radial tire repaired with a conventional method for repairing a radial tire.

The characteristic structure of the present embodiment will now be described. Due to the arrangement of the above-described reinforcing elements 11, the shape of the patch rubber 10, and the way the patch rubber 10 is attached, the inner edges of the reinforcing elements 11 in the tire radial direction are distributed over the trapezoid among edges 11a on the left side of FIG. 4, edges 12b on the short side 12b, and edges 11c on the right side of FIG. 4. As a result, the edges 11a, edges 11b, and edges 11c are positioned to have mutually different distances in a perpendicular direction from a tire circumferential line represented as X. Accordingly, as illustrated in FIG. 8, the inner edges 11a, 11b, and 11c of the reinforcing elements in the tire radial direction are not all aligned in a straight line. In this case, the edges 11a and edges 11c are arranged with wider intervals than the edges 11b, and even if a crack forms at these edges, the crack spreads less easily than a crack forming at the edges 11b. Moreover, even if a crack forms at the edges 11b, the crack does not easily spread to the edges 11a or the edges 11c. Therefore, it is possible to enhance the durability of the patch rubber 10 and extend the service life of the repaired tire 1.

Furthermore, since the ply cords 6 extend radially, the damaged portion 7 is in the shape of an inverted trapezoid. Accordingly, attaching the patch rubber 10 with the same shape in the same way as an inverted trapezoid allows for the patch rubber 10 to be attached in a manner necessary and sufficient from the perspective of the reinforcement effect. The repair time can therefore be reduced as compared to FIG. 8 since it is not necessary to attach an unnecessarily large patch rubber.

As in FIG. 4, the interval between the reinforcing elements 11 is preferably narrower than the interval between the ply cords. This is for the reinforcing elements 11 to reliably reinforce the damaged portion 7. In the case of 5 GPa nylon cords with a 1.2 mm cord diameter, the number of implanted patch cords is preferably between 2.5 and 5.8 cords/cm, with between 3.3 and 5.0 cords/cm being more preferable. These ranges are selected because at least 2.5 cords/cm obtains a more reliable reinforcement effect, and at most 5.8 cords/cm more reliably obtains the effect of preventing separation.

Whereas the reinforcing elements 11 are arranged in parallel, the ply cords 6 extend radially. Therefore, except for the middle ply cord among the three broken ply cords 6a, the reinforcing elements 11 are all not parallel to the ply cords. This configuration is more preferable than arranging the reinforcing elements 11 radially as well, since a strong reinforcement effect is achieved. Note that the intersection between the reinforcing elements and the ply cords is further described below with reference to FIG. 6.

As illustrated in FIG. 5, from the perspective of the reinforcement effect, the patch rubber 10 is preferably formed by layers of reinforcement sheets 10a. When nylon cords with a core diameter of 1.2 mm are used as the reinforcing elements 11, from the perspective of the reinforcement effect, approximately four to six layers are preferably provided.

Figure 6:
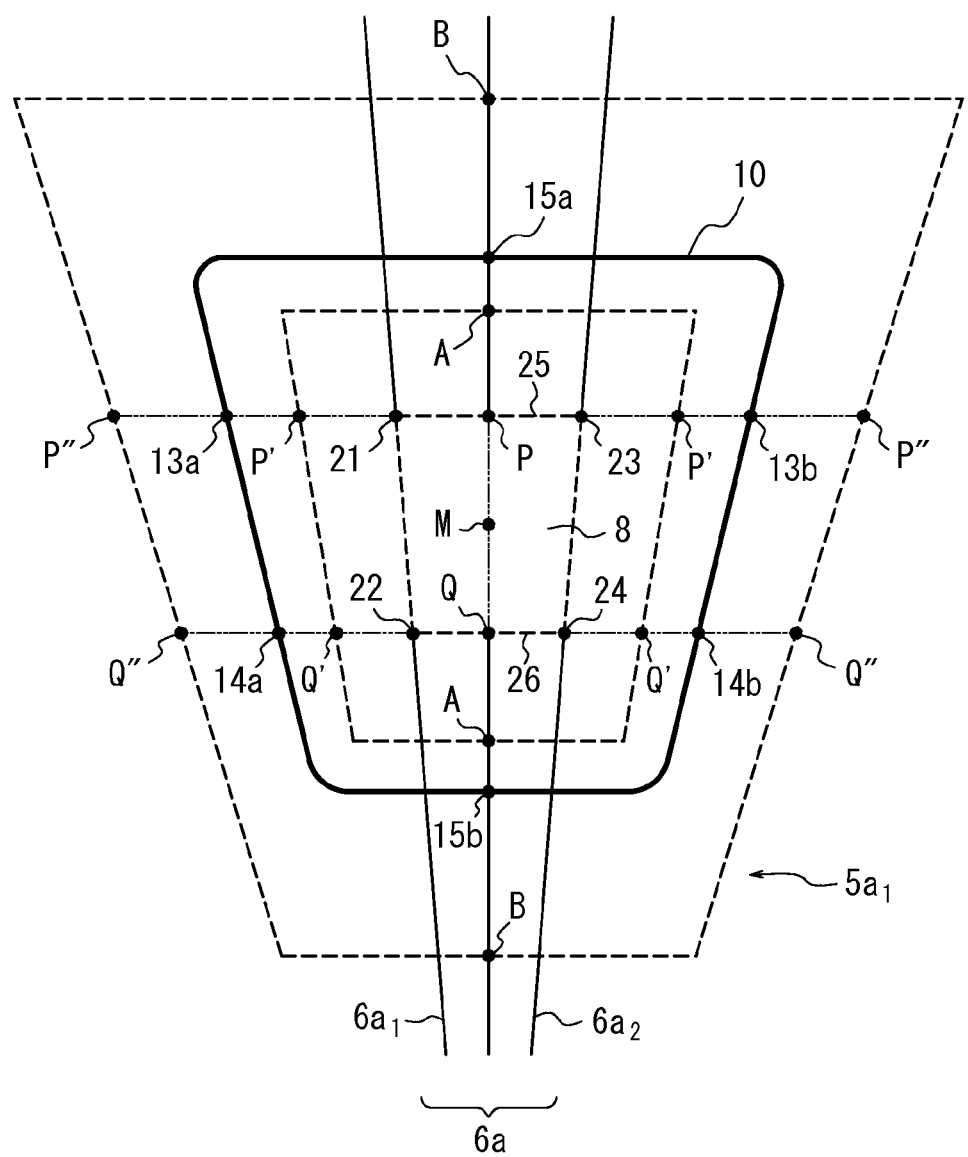
FIG. 6 is a pattern diagram illustrating the size of the patch rubber 10 with respect to a damaged region 8.

Next, the appropriate size of the attached patch rubber 10 will be described with reference to FIG. 6. Focusing on the broken ply cords 6a, the damaged portion 7 is now defined more precisely. As illustrated in FIG. 3A, the damaged portion 7 refers to a cavity in which ply cords and ply rubber are broken in the carcass ply 5a. On the other hand, focusing on the broken ply cords 6a in the present embodiment, in a plan view of the sidewall portion 3 from inside the tire transparently showing the carcass ply 5a (in the case of multiple plies, the carcass ply $5a_1$ closest to the inside of the tire), a region connecting four broken cord edges 21, 22, 24, and 23 of two ply cords $6a_1$ and $6a_2$, among the broken ply cords 6a, most separated in the tire circumferential direction is defined as a damaged region 8. An outermost side and an innermost side of the damaged region 6 in the tire radial direction are respectively defined as an upper side 25 (length x) and a lower side 26 (length y). Edges 13a and 13b of the patch rubber 10 positioned along an extension of the upper side 25 are preferably at a distance of (2 to 4)×(x/2) from the center P of the upper side 25. In FIG. 6, the positions at a distance of 2×(x/2) from the center P are indicated by P', and the positions at a distance of 4×(x/2) by P''. Accordingly, the edges 13a and 13b are positioned between P' and P''. Similarly, edges 14a and 14b of the patch rubber 10 positioned along an extension of the lower side 26 are preferably at a distance of (2 to 4)×(y/2) from the center Q of the lower side 26. In FIG. 6, the positions at a distance of 2×(y/2) from the center Q are indicated by Q', and the positions at a distance of 4×(y/2) by Q''. Accordingly, the edges 14a and 14b are positioned between Q' and Q''. Furthermore, edges 15a and 15b of the patch rubber 10 positioned along a line PQ are at a distance of (2 to 4)×(z/2) from the center M of a line segment PQ (length z). In FIG. 6, the positions at a distance of 2×(z/2) from the center M are indicated by A, and the positions at a distance of 4×(z/2) by B. Accordingly, the edges 15a and 15b are positioned between A and B. A factor of two or greater for the positions allows for more reliable reinforcement of the damaged region 8, whereas attaching a large patch rubber that exceeds a factor of four achieves no further reinforcement effect and instead increases the repair time due to repair of an unnecessary region. Therefore, a patch rubber with a size two to four times that of the damaged region 8 is preferably attached.

Next, the intersection between the reinforcing elements 11 and the ply cords 6 is further described below with reference to FIG. 6. In the present embodiment, an angle of intersection θ between the reinforcing elements 11 and the line PQ connecting the center P of the upper side 25 with the center Q of the lower side 26 is preferably at least 0° and at most 30°. When the number of damaged ply cords 6a is odd, as illustrated in FIG. 6, the line PQ extends in the direction of the center ply cord among the broken ply cords 6a. When the number is even, the line PQ extends in the direction of a center line between the two ply cords in the middle. FIG. 4 shows the case of θ=0°. Arranging the reinforcing elements in parallel to the ply cords is not preferable, since the reinforcing elements bear too much tension. In the present embodiment, however, as described above, the reinforcing elements are non-parallel to almost all of the ply cords. Therefore, even when θ=0°, a sufficient reinforcement effect is obtained by the interlacing effect between the ply cords and the reinforcing elements. On the other hand, if θ exceeds 30°, the interlacing effect is lessened, and therefore an angle of at most 30° is preferable.

When the patch rubber 10 is formed by layering a plurality of reinforcement sheets 10a, the angle of intersection θ of the reinforcing elements 11 in every reinforcement sheet is preferably at least 0° and at most 30°. In this case, the reinforcement sheets are preferably inclined consecutively, for example, in the opposite direction with respect to the line PQ, i.e. +15°, −15°, +15° . . . . Alternatively, a pattern of +15°, 0°, −15° may be repeated. Note that the reinforcing elements in each layer are arranged in the above angular relationship before attachment to the damaged portion and partial vulcanizing.

The repair method of the present embodiment can be applied to any radial tire yet is effective when applied to supersized tires, such as construction vehicle tires, that easily suffer large side cuts and that have a high cost per tire.

Embodiment 2: Method for Repairing a Radial Tire

In Embodiment 1, an example of attaching a trapezoidal patch rubber 10 is illustrated, yet instead of a perfect trapezoid, the patch rubber 10 may be a roughly trapezoidal shape in which the vertices and the sides are slightly rounded. FIG. 7(a) through 7(c) illustrate examples. Otherwise, Embodiment 2 is the same as Embodiment 1.

Embodiment 3: Other Repair Methods

The patch rubber used in the present invention is not limited to being a roughly trapezoidal shape. As long as a patch rubber in which edges of reinforcing elements are located along all sides can be arranged so that the inner edges of the reinforcing elements in the tire radial direction are not aligned in a straight line, the patch rubber may be in any shape and may be attached in any way.

Embodiment 4: Repaired Radial Tire

Embodiment 4 is the radial tire 1 repaired with the repair method illustrated above. FIG. 1 is a half cross-sectional diagram in the tire width direction of this radial tire. As the majority has been described in Embodiment 1, further description is omitted. Reference sign 32, however, denotes a belt provided outwards in the tire radial direction and made from one or more cord rubber cover layers. Examples of the cords are steel cords or organic fiber cords.

In the repaired radial tire 1, the patch rubber is attached so that the reinforcing elements 11 are parallel to a tire radial direction R and so that inner edges of the reinforcing elements 11 in the tire radial direction are positioned to have mutually different distances in a perpendicular direction from a tire circumferential line X. Otherwise, the structure of the repaired portion of the repaired tire is as described in Embodiment 1.

Embodiment 5: Patch Rubber

Embodiment 5 is the patch rubber 10 (FIG. 4) that is for repairing a radial tire and can be used favorably in the above repair method and repaired tire. The patch rubber 10 has at least one reinforcement sheet 10a with a plurality of reinforcing elements 11 extending in parallel and covered with rubber. Among the edges of the reinforcing elements 11, edges 11a, 11b, and 11c on at least one side of the reinforcing elements are positioned to have mutually different distances in a perpendicular direction from a given line. In the present embodiment, the edge 11a, edge 11b, and edge 11c have mutually different distances in a perpendicular direction from any imaginary line. According to this structure, when attaching the patch rubber 10 to the damaged portion, the inner edges of the reinforcing elements in the tire radial direction can be arranged so as not to be in a straight line, and the repair method of the present invention can be applied.

Figure 9:
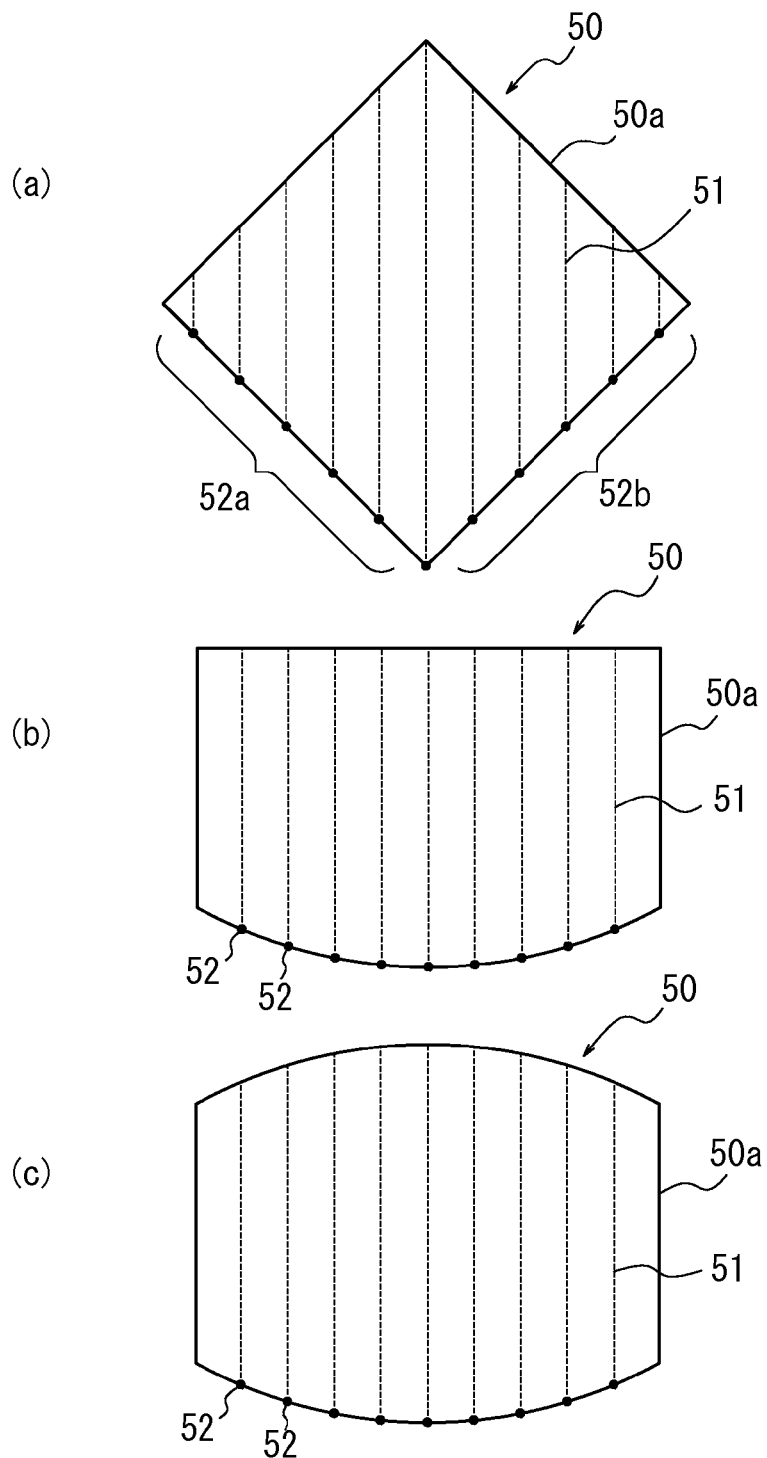
FIG. 9 is a plan view of a patch rubber according to the present invention, illustrating a pattern of reinforcing elements 51 positioned within a reinforcement sheet 50 with dashed lines.

Alternatively, the patch rubber may be as illustrated in FIG. 9. The patch rubber 50 in FIG. 9(a) has a square reinforcement sheet 50a with a plurality of reinforcing elements 51 forming a 45° angle with each side and extending in parallel. Therefore, among the edges of each of the reinforcing elements 51, the edges 52a and 52b of the reinforcing elements at the bottom of the diagram do not all have the same distance in a perpendicular direction from any imaginary line. The patch rubber 50 in FIG. 9(b) has a rectangular reinforcement sheet 50a, in which one of the long sides is rounded outwards, with a plurality of reinforcing elements 51 extending in parallel to the short sides and to each other. In this case as well, the edges 52 of the reinforcing elements at the bottom of the diagram do not all have the same distance in a perpendicular direction from any imaginary line. The patch rubber 50 in FIG. 9(c) has a rectangular reinforcement sheet 50a, in which both long sides are rounded outwards, with a plurality of reinforcing elements 51 extending in parallel to the short sides and to each other. This case is more preferable, since not only the edges 52 of the reinforcing elements at the bottom of the diagram but also the edges at the top of the diagram do not all have the same distance in a perpendicular direction from any imaginary line.

Note that among these patch rubbers, the patch rubber 10 in FIG. 4 and the patch rubber 50 in FIG. 9(a), in which the edges of the reinforcing elements are distributed over all sides, are preferable because these patch rubbers make it easy to avoid attaching the patch rubber to an unnecessary portion from the perspective of the reinforcement effect, thereby shortening the repair time. Furthermore, the degree of freedom for attachment to the damaged portion increases.

Embodiment 6: Method for Repairing a Radial Tire

If there is doubt about the strength of reinforcement of the damaged portion when, as in the above repair method, patch rubber is only attached to reinforce the damaged portion of the carcass from the inner side of the tire, in particular when the damaged portion is large, as when three or more consecutive ply cords are broken, then there is a risk of the repaired portion suffering damage again before reaching the expected wear life. On the other hand, in order to guarantee sufficient strength with this repair method, it is necessary to attach a patch rubber that is rather large with respect to the damaged portion of the carcass, thereby making it necessary to extract rubber over a large area around the damaged portion of the carcass and to use a large amount of cover rubber to cover the patch rubber. A great increase in the repair time and cost of materials can thus also be expected. Since the rigidity of the repaired portion might be less than surrounding portions, there is a risk of new damage occurring starting at locations with a difference in rigidity, such as the edges of the reinforcing elements in the patch rubber and the edges of the broken ply cords.

Therefore, another object of the present invention is to provide a method for repairing a pneumatic tire that allows the tire to be used until the end of wear life and that shortens the repair time by achieving sufficient reinforcement strength when repairing damage to the tire caused by a damaged carcass.

A method for repairing a radial tire to achieve the above object is a method for repairing a radial tire comprising a tread portion, a pair of sidewall portions extending inwards in a tire radial direction from either edge of the tread portion, bead portions that extend respectively from the sidewall portions inwards in the tire radial direction, and a carcass having at least one radial carcass ply with a plurality of ply cords covered in ply rubber, the carcass ply extending toroidally across the bead portions, the sidewall portions, and the tread portion, at least one ply cord in the carcass ply being broken along with ply rubber at one of the sidewall portions. Two pieces of the patch rubbers, each including a plurality of reinforcing elements arranged in parallel and covered with rubber, are prepared per one damaged portion of the carcass ply with the broken ply cord. Side rubber is extracted around the damaged portion along the sidewall portion from outside the tire. Inner liner rubber is extracted around the damaged portion along the sidewall portion from inside the tire to expose edges formed by the break in the carcass ply. The patch rubbers are respectively attached from an inner side and an outer side of the radial tire at a location where the side rubber and inner liner rubber are extracted from the damaged portion so that the reinforcing elements are parallel to a tire radial direction and so that inner edges of the reinforcing elements in the tire radial direction are positioned to have mutually different distances in a perpendicular direction from a tire circumferential line. The patch rubbers sandwich and hold the edges formed by the break in the carcass ply.

In a tire repaired with this method, the edges formed by the break in the carcass ply are sandwiched by the two patch rubbers. Therefore, the reinforcement strength is enhanced as compared to the repair method that only attaches one patch rubber to the broken section of the carcass ply, thereby allowing the tire to be used until reaching the expected wear life without the repaired section once again suffering damage. Furthermore, since sufficient reinforcement strength is obtained with the patch rubbers, reliable repair is possible even when the damaged portion is large, as when three or more consecutive ply cords are broken. Sufficient reinforcement strength is also obtained without increasing the size of the patch rubber as done conventionally. The reinforced region (the size of the patch rubber) can therefore be kept to a minimum, thus reducing the repair time and cost of materials. Moreover, since the rigidity of the repaired portion can be made equivalent to the rigidity of surrounding portions, no damage occurs starting at the edges of the reinforcing elements in the patch rubbers or the edges formed by the break in the ply cord. Additionally, by attaching the patch rubbers so that the reinforcing elements are parallel to a tire radial direction and so that inner edges of the reinforcing elements in the tire radial direction are positioned to have mutually different distances in a perpendicular direction from a tire circumferential line, the interval between edges widens. Therefore, even if a crack starts at an edge, the crack does not easily spread to neighboring edges. Accordingly, it is possible to enhance the durability of the patch rubbers and extend the service life of the repaired tire.

In this method for repairing a radial tire, the patch rubber attached from the outer side of the tire is preferably larger than the patch rubber attached from the inner side of the tire.

In this method for repairing a radial tire, when attaching the patch rubbers respectively from the inner side and the outer side of the tire, an extension direction of the reinforcing elements in each of the patch rubbers is preferably aligned with an extension direction of the broken ply cord.

Moreover, in this method for repairing a radial tire, the angle of intersection between the ply cords and the reinforcing elements in the patch rubbers is at least 0° and at most 30°.

Embodiment 6, which is based on the above structure and the figures, will now be described in detail.

Figure 10:
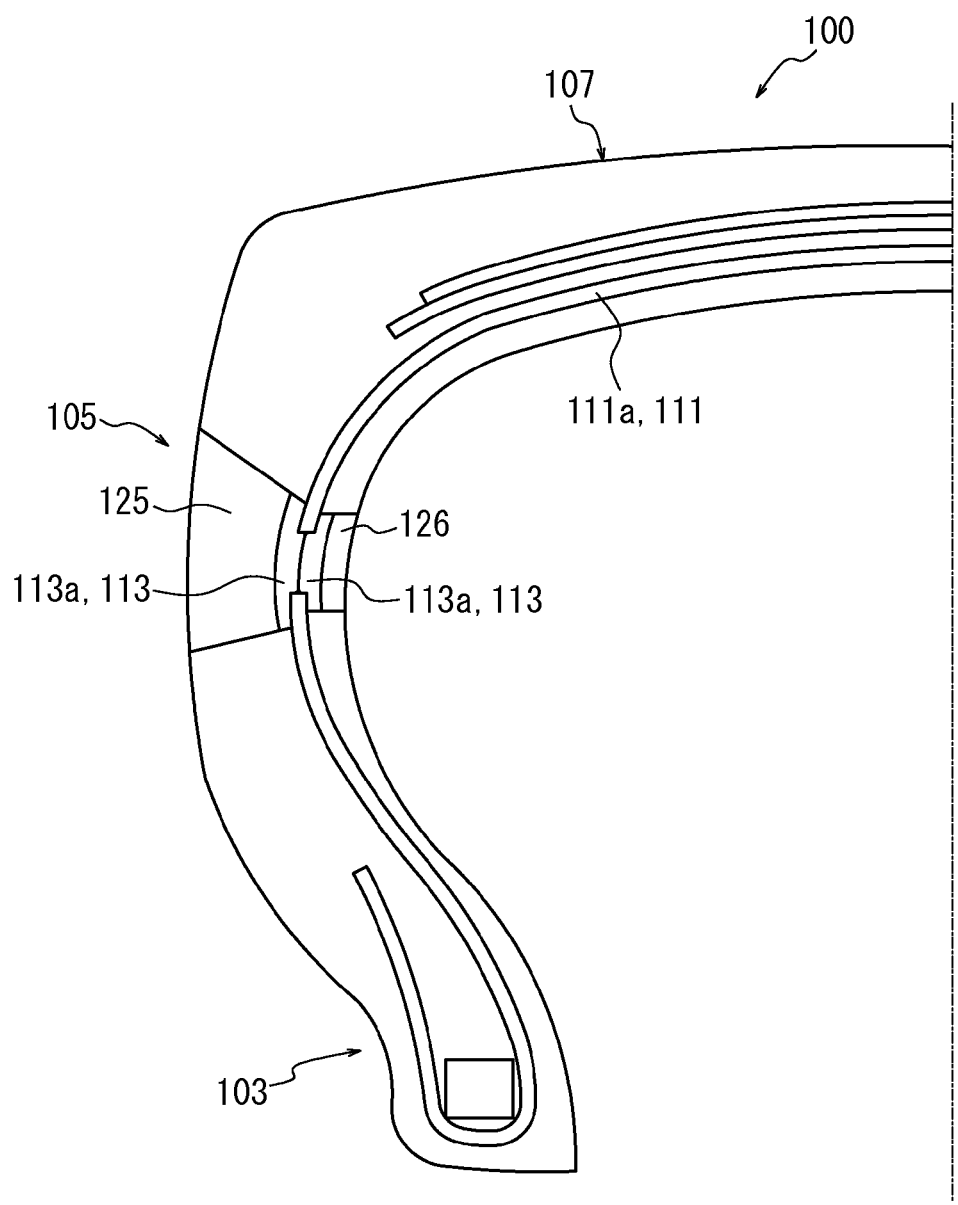
FIG. 10 is a cross-sectional diagram (half diagram) in the width direction of a radial tire that is repaired using a repair method that serves as an example of the present invention.

In FIG. 10, reference sign 101 denotes a pneumatic tire (hereinafter referred to as a tire) that is a radial tire repaired with the repair method serving as an example in the present embodiment. The tire has a carcass 111 formed by at least one layer of a carcass ply 111a with a plurality of ply cords 109 covered in ply rubber that extend from a bead portion 103 across a sidewall portion 105 to a tread portion 107. The material for the ply cords 109 may be steel, organic fiber, or the like and is not limited to these examples. Natural rubber, synthetic rubber, carbon black, and the like are examples of the material for the ply rubber. The hardness of the rubber may be set approximately from 40 to 80. Here, a method for repairing the damaged portion in a tire 1 that has suffered a side cut, causing three cords in the carcass ply 111a to break, will be described.

FIG. 11 illustrates an example of a patch rubber that may be used as a reinforcing cord layer in the repair method of the present embodiment. As illustrated in FIG. 11, the patch rubber 113 is constituted by at least one layer of a reinforcement sheet 113a, here eight layers, that is a cord rubber reinforcement layer in which a plurality of reinforcing elements 115 arranged in parallel are covered with rubber. Here, the planar shape of the patch rubber is a trapezoid, and a portion or all of the edges of the reinforcing elements 115 are arranged not to be horizontally aligned. The number of reinforcing elements 115 may be modified as necessary in accordance with the number of broken ply cords or the like. The material for the rubber covering the reinforcing elements 115 may be natural rubber, synthetic rubber, carbon black, or the like. The rubber hardness is set approximately from 40 to 80, and in particular the rubber is equivalent to the rubber used in the carcass ply 111a. The reinforcing elements 115 may be steel cords or organic fiber cords. In the case of organic fiber material, the cords may be a predetermined number of twisted filament bundles, a single filament, or a plurality of non-twisted filaments.

Figure 12:
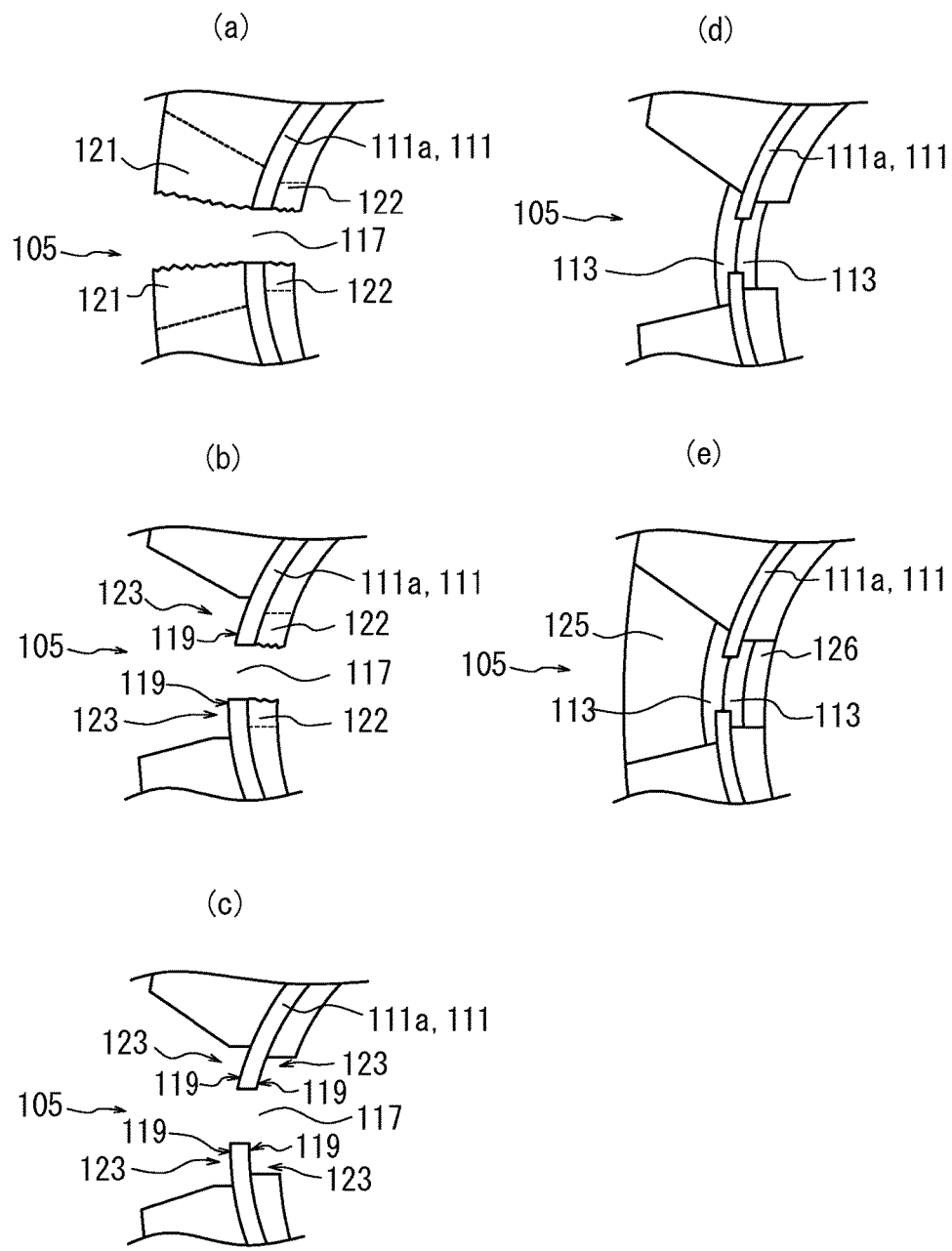
FIG. 12(a) through (e) are expanded cross-section diagrams of a damaged portion in the radial tire in FIG. 10, illustrating the steps in the repair method that serves as an example of the present invention.

In order to repair a damaged portion 117 illustrated in FIG. 12(a) using such a patch rubber 113, first, as illustrated in FIGS. 12(b) and 12(c), edges 119 formed by the break in the carcass ply 111a are exposed by removing, in the damaged portion 117, side rubber portions 121 and inner liner rubber portions 122 adjacent on the inside and outside of the carcass 11 by buffing or the like from the inner side and the outer side of the tire, while not exposing the cords of the carcass ply 111a insofar as possible.

Next, as illustrated in FIGS. 12(d) and (e), the patch rubbers 113 are attached from the inner side and the outer side of the tire to respective concavities 123, in the damaged portion 117, formed by removing the side rubber portions 121 and inner liner rubber portions 122 while not exposing the cords of the carcass ply 111a insofar as possible. These two patch rubbers 113 are attached so as to sandwich the edges 119 formed by the break in the carcass ply 111a. At this point, the patch rubbers 113 are attached so that an extension direction of the reinforcing elements 115 in each of the patch rubbers 113 is aligned with an extension direction of the broken ply cord 109. In other words, the attachment is such that the reinforcing elements 115 are parallel to a tire radial direction. Additionally, the patch rubbers are attached so that inner edges of the reinforcing elements 115 in the tire radial direction are positioned to have mutually different distances in a perpendicular direction from a tire circumferential line. As a result, the interval between edges widens, so that even if a crack starts at an edge, the crack does not easily spread to neighboring edges. Therefore, it is possible to enhance the durability of the patch rubbers 113 and extend the service life of the repaired tire 101.

Subsequently, an unvulcanized new side rubber portion 125 and new inner liner rubber portion 126, which may be the same material as the extracted rubbers 121 and 122, are applied on top of the attached patch rubbers 113. After application, the new side rubber portion 125 and new inner liner rubber portion 126 are vulcanized. The patch rubbers 113 before attachment are also preferably made from unvulcanized rubber and are vulcanized along with the vulcanization of the new side rubber portion 125 and new inner liner rubber portion 126. The reason is that if the patch rubbers 113 are pre-vulcanized, they run the risk of being excessively vulcanized by the vulcanization of the new side rubber portion 125 and new inner liner rubber portion 126. Furthermore, using patch rubbers 113 that are unvulcanized before attachment to the tire allows for the patch rubbers 113 to be attached precisely to the tire, thus preventing air bubbles from entering or forming.

In a tire repaired with this method, the edges formed by the break in the carcass ply are sandwiched by the two patch rubbers. Therefore, the reinforcement strength is markedly enhanced as compared to a conventional repair method that only attaches one patch rubber to the broken section of the carcass ply, thereby allowing the tire to be used until reaching the expected wear life without the repaired section once again suffering damage. Furthermore, since sufficient reinforcement strength is obtained with the patch rubbers 113, reliable repair is possible even when the damaged portion is large, as when three or more consecutive ply cords are broken. Sufficient reinforcement strength is also obtained without increasing the size of the patch rubber as done conventionally. The reinforced region (the size of the patch rubber 113) can therefore be kept to a minimum, thus reducing the repair time and cost of materials. Moreover, since the rigidity of the repaired portion can be made equivalent to the rigidity of surrounding portions, no damage occurs starting at the edges of the reinforcing elements 115 in the patch rubbers 113 or the edges 119 formed by the break in the ply cords 109.

Figure 13:
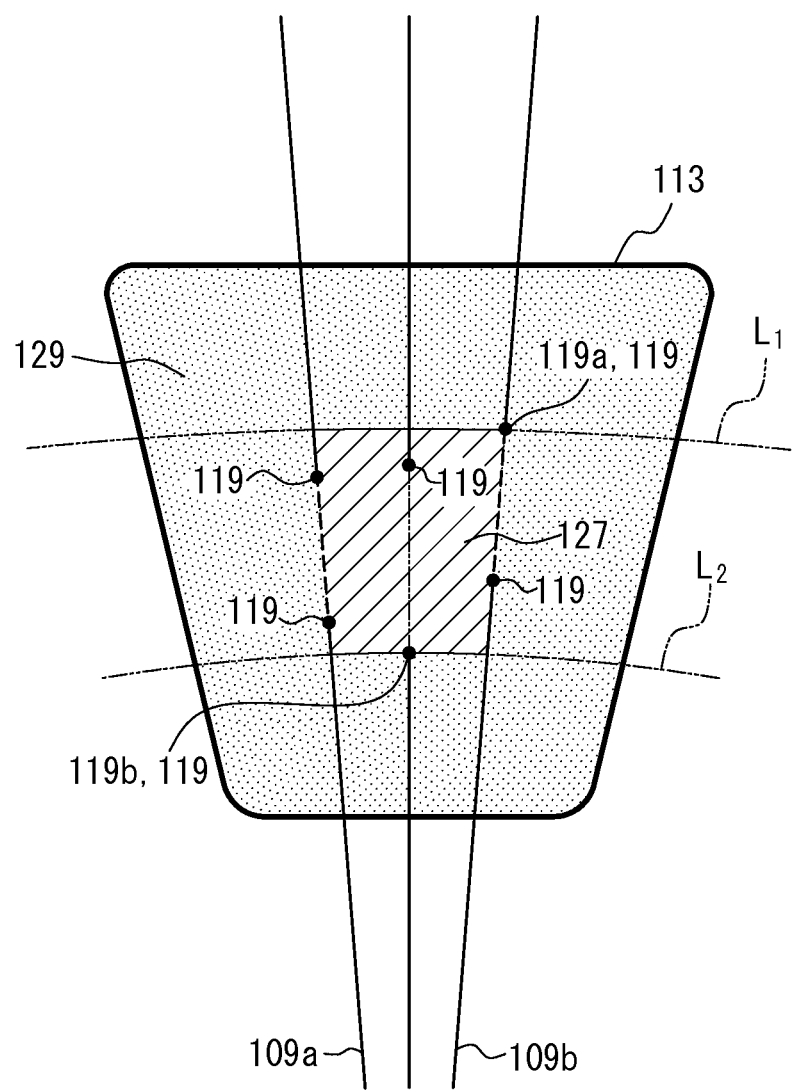
FIG. 13 is a plan view of patch rubber illustrating the size and the like of the patch rubber appropriate for a damaged region.

In the above embodiment, the reason for adopting a trapezoidal shape for the patch rubbers 113 is as follows. A damaged region 127 (region indicated by diagonal lines) produced by a break in the ply cords 109 can, as illustrated in FIG. 13, be defined as a portion bordered by the two outermost broken ply cords 109a and 109b and by circumferential lines L1 and L2 that respectively traverse the outermost edge 119a in the tire radial direction and the innermost edge 119b in the tire radial direction among edges 119 formed by breaks when a plurality of ply cords 9 are broken. The damaged region 127 is roughly trapezoidal, and attaching a similarly shaped patch rubber 113 allows for the size of the patch rubber 113 to be minimized while guaranteeing the desired reinforcement effect.

At this point, the size of the patch rubber 113 attached from the inner side of the tire is preferably 2 to 4 times that of the damaged region 127, so as to form an overlapping area 129 (indicated by the matted portion in FIG. 13) between the edges 119 formed by the breaks in the ply cords 109 and the periphery of the patch rubber 113. The patch rubber 113 is more preferably aligned with the damaged region 127 so that the overlapping area 129 is formed evenly. On the other hand, the size of the patch rubber 113 attached from the outer side of the tire is preferably 1.1 to 4 times that of the damaged region 127, so as to form an overlapping area 129 between the edges 119 formed by the breaks in the ply cords 109 and the periphery of the patch rubber 113. The patch rubber 113 is more preferably aligned with the damaged region 127 so that the overlapping area 129 is formed evenly. As a result, the two opposing patch rubbers 113 can reliably hold the edges 119 formed by the breaks in the ply cords 109, thereby allowing the patch rubbers 113 to reliably enhance the reinforcement strength. If the size of the outer patch rubber 113 is less than two times that of the damaged region 127, or if the size of the inner patch rubber 113 is less than 1.1 times that of the damaged region 127, the patch rubbers 113 do not hold the edges 119 formed by the breaks in the ply cords 109 with sufficient strength. Conversely, if the size of the inner or outer patch rubber 113 exceeds four times that of the damaged region 127, not only is the reinforcement strength too great, but the repair time also increases.

It is also preferable for the patch rubber 113 attached from the outer side of the tire 101 to be larger than the patch rubber 113 attached from the inner side of the tire 101. The reason is because the patch rubber 113 attached from the outer side has a greater reinforcement effect than the patch rubber 113 attached from the inner side, and the difference in size allows for a decrease in torque of the patch rubbers 113.

The interval d between the reinforcing elements 115 in the patch rubbers 113 is preferably more narrow than the interval D between the ply cords 109, so as to allow the patch rubbers 113 to effectively reinforce the damaged portion.

When attaching the patch rubbers 113, the patch rubbers 113 are preferably disposed so that an extension direction of the reinforcing elements 115 in each of the patch rubbers 113 is aligned with an extension direction of the broken ply cords 109 (in particular, the ply cords 109 in the ply layer closest to the patch rubbers 113). As a result, inter-cord shear deformation between the ply cords 109 and the reinforcing elements 115 can be suppressed.

During repair of the damage to the radially arranged ply cords 109, the reinforcing elements in the patch rubbers 113 are preferably arranged to intersect at an angle between 0° and ±30° with respect to an extension direction of the ply cords 109. The angle of intersection referred to here is the angle of intersection between the reinforcing elements 115 and the extension direction of the center ply cord 109 among the repaired ply cords 109, or in the case of repairing an even number of ply cords 109, a center line between the two ply cords 109 in the middle. The angle of intersection between the reinforcing elements 115 and the ply cords 109 may be varied between the reinforcement sheets 113a constituting each patch rubber 113. From a bead portion to a hump portion for which only a ply cord is damaged, the extension direction of the reinforcing elements in the attached patch rubber may be in a range of 0° to ±30° with respect to an extension direction of the ply cords, with 0° being preferable insofar as possible.

EXAMPLES (Evaluation 1)

Next, to further illustrate the effects of the present invention, a comparative evaluation that applied repair methods according to the Examples and Comparative Examples below will be described.

Example 1

An off-the-road radial tire (ORR 46/90R57) was mounted on a rim meeting JATMA specifications and run for 3000 hours at 8 km/h under the conditions of 700 kPa internal pressure and a 63 t load. Subsequently, as illustrated in FIG. 3(a) and FIG. 4, a side cut was made to break three cords in the carcass ply.

Figure 3:
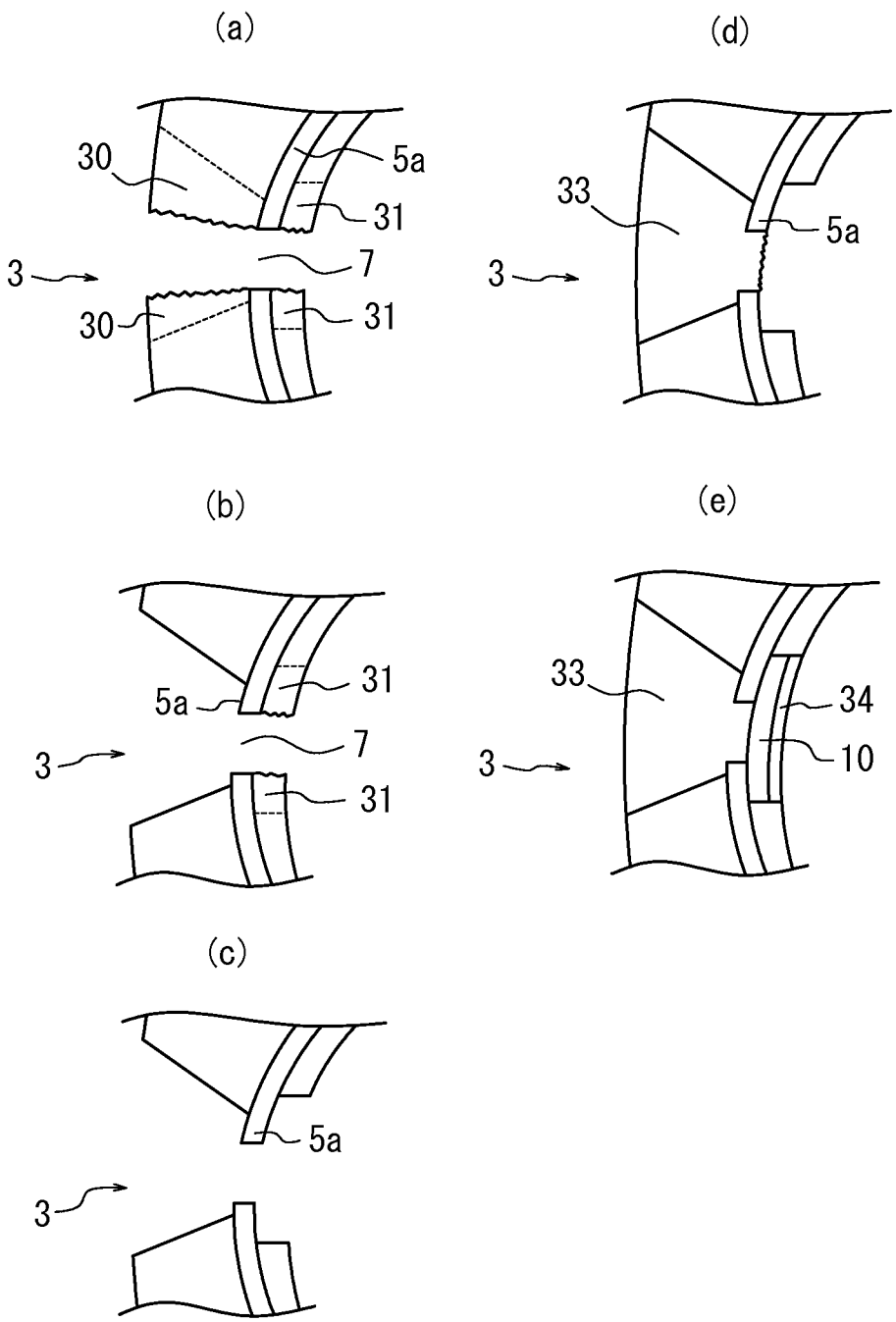
FIG. 3 is a diagram illustrating a representative method for repairing a radial tire according to the present invention, with (a) illustrating a state in which a radial tire 1 has received a side cut at the sidewall portion 3 and a carcass ply 5a is broken, (b) illustrating a state in which side rubber portions 30 around the damaged portion 7 have been extracted from outside the tire until the carcass ply is exposed, (c) illustrating a state in which inner liner rubber portions 31 around the damaged portion 7 have been extracted from inside the tire until the carcass ply is exposed, (d) illustrating a state in which a new side rubber portion 33 around the damaged portion 7 has been applied from outside the tire, and (e) illustrating a state in which a patch rubber 10 integrated with a new inner liner rubber portion 34 has been attached to the damaged portion 7.

Number of carcass plies: 1
Ply cords: steel cords with cord diameter of 4.2 mm
Material for ply rubber: natural rubber A patch rubber was applied with the steps illustrated in FIG. 3. Partial vulcanization was then applied to the damaged portion, yielding a repaired radial tire.
Material for patch rubber: natural rubber (vulcanized rubber)
Patch cords: nylon cords with cord diameter of 1.2 mm
Number of implanted cords per layer: 4/cm The patch rubber was formed from three layers of reinforcement sheets, with θ=0° in every sheet.

As for the size of the damaged region and the patch rubber, in terms of the description in FIG. 6, the damaged region was as follows: length x of the upper side=25 mm, length y of the lower side=23 mm, and height z of the line PQ=100 mm. By contrast, the size of the patch rubber was as follows: length between reference signs 13a and 13b=75 mm, length between reference signs 14a and 14b=46 mm, and length between reference signs AB=200 mm. The edges were thus at positions of 3×(x/2), 2×(y/2), and 2×(z/2).

(Evaluation of Durability of Damaged Portion)

The repaired tire was run again, and the running time until damage occurred starting at the edge of the reinforcing elements in the patch rubber was measured. As the run time increases, the durability of the patch rubber is higher. Table 1 shows the results.

(Repair Time)

The time for repair was measured up until before partial vulcanization. Table 1 shows the results.

Comparative Example 1

Other than repairing the tire by attaching a rectangular patch rubber as illustrated in FIG. 8, testing was performed under the same conditions as Example 1. The length of the long sides was the same as the length of the long side in the pair of parallel sides in the trapezoid of Example 1.

Example 2

Comparative Example 2

Other than the patch rubber before attachment being made from unvulcanized rubber, testing was performed under the same conditions as Example 1 and Comparative Example 1.

Examples 3 to 5

Other than the shape of the patch rubber being as in FIG. 7(a), (b), and (c), testing was performed under the same conditions as Example 2. Note that in FIG. 7, the two vertices along the long side are curved with a radius of curvature of 3 mm, and the three vertices along the short side are curved with a radius of curvature of 6 mm. Furthermore, in FIG. 7(b), the long sides and short sides are curved with respective radii of curvature of 200 mm and 100 mm, and in FIG. 7(c), the two sides other than the pair of parallel sides are curved with a radius of curvature of 100 mm.

Examples 6 to 8

Other than varying θ as indicated in Table 1 in the reinforcing elements of all three layers, testing was performed under the same conditions as Example 2.

Examples 9 to 12

Other than varying the size of the patch rubber as indicated in Table 1, testing was performed under the same conditions as Example 2.

TABLE 1

| | Patch Rubber | | | | | | Evaluation Result | |
|---|---|---|---|---|---|---|---|---|
| | | | Size | | | | | Repair |
| | Shape | Vulcanized | (x/2) W Factor | (y/2) W Factor | (z/2) W Factor | θ (°) | Running Time | Time (min) |
| Comparative Example 1 | FIG. 8 | Yes | 3 | — | 2 | 0 | 800 | 60 |
| Example 1 | FIG. 4 | Yes | 3 | 2 | 2 | 0 | 1600 | 45 |
| Comparative Example 2 | FIG. 8 | No | 3 | — | 2 | 0 | 1500 | 60 |
| Example 2 | FIG. 4 | No | 3 | 2 | 2 | 0 | 2500 | 45 |
| Example 3 | FIG. 7(a) | No | 3 | 2 | 2 | 0 | 2400 | 45 |
| Example 4 | FIG. 7(b) | No | 3 | 2 | 2 | 0 | 2600 | 45 |
| Example 5 | FIG. 7(c) | No | 3 | 2 | 2 | 0 | 2500 | 45 |
| Example 6 | FIG. 4 | No | 3 | 2 | 2 | 20 | 2300 | 45 |
| Example 7 | FIG. 4 | No | 3 | 2 | 2 | 30 | 2100 | 45 |
| Example 8 | FIG. 4 | No | 3 | 2 | 2 | 40 | 1700 | 45 |
| Example 9 | FIG. 4 | No | 2 | 2 | 2 | 0 | 2100 | 38 |
| Example 10 | FIG. 4 | No | 3 | 3 | 3 | 0 | 2650 | 70 |
| Example 11 | FIG. 4 | No | 4 | 4 | 4 | 0 | 2700 | 80 |
| Example 12 | FIG. 4 | No | 5 | 5 | 5 | 0 | 2700 | 90 |

Table 1 shows that in the tires repaired with the repair method of the Examples, the patch rubber has a higher durability and the repair time is shorter than in the tires repaired the repair method of the Comparative Examples.

(Evaluation 2)

Next, a performance evaluation was made on a sample of a tire repaired with the repair method according to Embodiment 6 of the present invention, as described below. The tires used in Examples 21 to 24 and Comparative Example 20 are all off-the-road radial tires (ORR 46/90R57).

Figure 14:
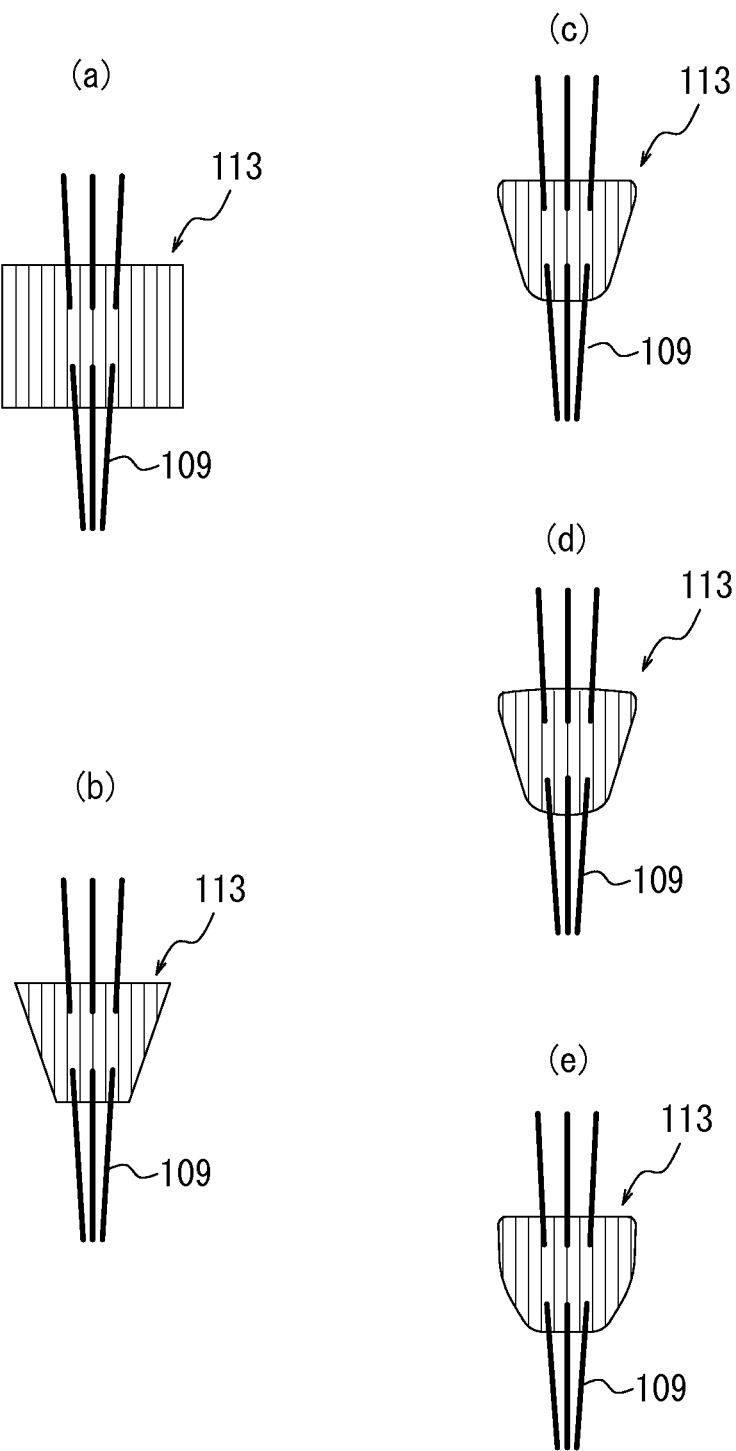
FIG. 14(a) illustrates the shape of the patch rubber in Comparative Example 20, and (b) through (e) illustrate the shape of the patch rubber in Examples 21 through 24.

In the radial tires used in Examples 21 to 24 and Comparative Example 20, the sidewall portion received a side cut that broke three ply cords, and the damaged portions did not differ. The repair method adopted was to attach patch rubbers of the same shape respectively from the inner side and outer side of the tire in Examples 21 to 24 and to attach a patch rubber from the outer side of the tire in Comparative Example 20. The shapes of the patch rubbers were indicated by FIG. 14(a) for Comparative Example 20, FIG. 14(b) for Example 21, FIG. 14(c) for Example 22, FIG. 14(d) for Example 23, and FIG. 14(e) for Example 24. Three reinforcement sheet layers were used in all of the patch rubbers, which were attached so as to form an even overlapping area and so that the reinforcing elements were parallel to one of the broken ply cords.

The repaired tires of Examples 21 to 24 and the Comparative Example were respectively attached to rims, mounted on a vehicle, and used on an ordinary road with a regular load and regular internal pressure. As a result, the tires of Examples 21 to 24 were all used until reaching the wear life, i.e. until the slip line was visible, without damage at the repaired location. The hours of use were 2500 hours for Example 21, 2400 hours for Example 22, 2600 hours for Example 23, and 2500 hours for Example 24. The repaired section of the tire of Comparative Example 20 suffered damage starting at the edge of the reinforcing cord after 1000 hours of use, before the tire was completely worn. For Comparative Example 20, repair required 80 minutes for buffing and attachment of rubber, whereas the time was shortened to 45 minutes for Examples 21 to 24.

As the above evaluation results show, repairing with the repair method of examples 21 to 24 allows for use of the tire until reaching the wear life and shortens the repair time.

INDUSTRIAL APPLICABILITY

According to the present invention, it is possible to enhance the durability of a patch rubber attached to the damaged portion of the carcass ply from the inner side of the tire and to extend the service life of the repaired tire. The repair time can also be shortened, since the patch rubber is not attached to an unnecessary portion from the perspective of the reinforcement effect.

REFERENCE SIGNS LIST

1: Radial tire
2: Tread portion
3: Sidewall portion
4: Bead portion
5: Carcass
5a: Carcass ply
6: Ply cord
6a: Broken ply cord
7: Damaged portion
8: Damaged region
10: Patch rubber
10a: Reinforcement sheet
11: Reinforcing element
11a, 11b, 11c: Inner edges of reinforcing elements in tire radial direction
30: Side rubber portion around damaged portion
31: Inner liner rubber portion around damaged portion
32: Belt
33: New side rubber portion
34: New inner liner rubber portion
101: Radial tire
103: Bead portion
105: Sidewall portion
107: Tread portion
109: Ply cord
111: Carcass
111a: Carcass ply
113: Patch rubber
113a: Reinforcement sheet
115: Reinforcing element
117: Damaged portion
119: Ply cord edge
121: Side rubber portion around damaged portion
122: Inner liner rubber portion around damaged portion
123: Concavity
125: New side rubber portion
126: New inner liner rubber portion
127: Damaged region
129: Overlapping area

The invention claimed is:

1. A repaired radial tire comprising a tread portion, a pair of sidewall portions extending inwards in a tire radial direction from either edge of the tread portion, bead portions that extend respectively from the sidewall portions inwards in the tire radial direction, and a carcass having at least one radial carcass ply with a plurality of ply cords covered in ply rubber, the carcass ply extending toroidally across the bead portions, the sidewall portions, and the tread portion, wherein:

at least one ply cord in the carcass ply is broken along with ply rubber at one of the sidewall portions;

a patch rubber is attached from an inner side of the tire to a damaged portion of the carcass ply with the broken ply cord, the patch rubber including one or more reinforcement sheets, each with a plurality of reinforcing elements arranged in parallel and covered with rubber;

the patch rubber is attached so that the reinforcing elements are parallel to a tire radial direction and so that inner edges of the reinforcing elements in the tire radial direction are positioned to at least partially have mutually different distances in a perpendicular direction from a tire circumferential line;

the patch rubber has a generally trapezoidal shape;

the patch rubber is attached so that a long side of the pair of parallel sides is located outwards in the tire radial direction, and a short side of the pair of parallel sides is located inwards in the tire radial direction;

a plurality of the inner edges of the reinforcing elements in the tire radial direction are positioned on both oblique side edges of the trapezoid of the patch rubber, respectively, and in a plan view of the sidewall portion from inside the tire transparently showing the carcass ply closest to the inside of the tire, a region connecting four broken cord edges of two ply cords, among broken ply cords, most separated in a tire circumferential direction is defined as a damaged region, and an outermost side and an innermost side in the tire radial direction are respectively an upper side of length x and a lower side of length y;

edges of the patch rubber positioned along an extension of the upper side are at a distance of (2 to 4)×(x/2) from a center P of the upper side;

edges of the patch rubber positioned along an extension of the lower side are at a distance of (2 to 4)×(y/2) from a center Q of the lower side; and edges of the patch rubber positioned along a line PQ are at a distance of (2 to 4)×(z/2) from a center M of a line segment PQ of length z, wherein one end of all reinforcing elements in the patch rubber terminates at the long side of the pair of parallel sides, a hardness of the rubber covering the reinforcing elements is from 40 to 80, the rubber covering the reinforcing elements is the same as the ply rubber used in the carcass ply, the reinforcing elements comprise nylon cord with a cord diameter of between 0.4 to 1.5 mm, the tensile modulus of elasticity of the reinforcing elements is between 3.0 to 7.0 GPa, and the reinforcing elements are thinner than the ply cords.

2. The repaired radial tire according to claim 1, wherein:

the patch rubber is attached so that the long side and the short side extend in a tire circumferential direction.

3. The radial tire according to claim 1, wherein:

in a plan view of the sidewall portion from inside the tire transparently showing the carcass ply closest to the inside of the tire, a region connecting four broken cord edges of two ply cords, among broken ply cords, most separated in the tire circumferential direction is defined as a damaged region, and an outermost side and an innermost side in the tire radial direction are respectively an upper side of length x and a lower side of length y;

edges of the patch rubber positioned along an extension of the upper side are at a distance of (3 to 4)×(x/2) from a center P of the upper side;

edges of the patch rubber positioned along an extension of the lower side are at a distance of (2 to 4)×(y/2) from a center Q of the lower side; and edges of the patch rubber positioned along a line PQ are at a distance of (2 to 4)×(z/2) from a center M of a line segment PQ of length z.

4. The radial tire according to claim 3, wherein an angle of intersection between the reinforcing elements in each reinforcement sheet and the line PQ connecting the center P of the upper side with the center Q of the lower side is at least 0° and at most 30°.

5. The radial tire according to claim 1, wherein an angle of intersection between the reinforcing elements in each reinforcement sheet and the line PQ connecting the center P of the upper side with the center Q of the lower side is at least 0° and at most 30°.

* * * * *